United States Patent [19]

Schneider

[11] Patent Number: 5,052,342

[45] Date of Patent: Oct. 1, 1991

[54] SUET-SEED CAKE BIRD FEEDER

[76] Inventor: Paul Schneider, 2604 N. Huebner, Oconomowoc, Wis. 53066

[21] Appl. No.: 534,952

[22] Filed: Jun. 8, 1990

[51] Int. Cl.⁵ .............................................. A01K 39/00
[52] U.S. Cl. .................... 119/51.03; 119/57.8
[58] Field of Search ............... 119/51.01, 51.03, 52.2, 119/57.8

[56] References Cited

U.S. PATENT DOCUMENTS

| | | | |
|---|---|---|---|
| 590,458 | 9/1897 | Lee | 119/51.03 |
| 1,092,314 | 4/1914 | White | 119/51.03 |
| 1,221,019 | 4/1917 | Bowdish | 119/51.03 |
| 2,267,062 | 12/1941 | Walter et al. | 119/51.03 |
| 3,140,692 | 7/1964 | Beyea | 119/51.03 |
| 3,273,537 | 9/1966 | Orr | 119/51.03 |
| 3,399,650 | 9/1968 | Goodman | 119/51.03 |
| 4,104,987 | 8/1978 | Winston | 119/57.8 |
| 4,574,738 | 3/1986 | Tominaga | 119/52.2 X |
| 4,793,289 | 12/1988 | Peeso | 119/51.03 |

Primary Examiner—Gene Mancene
Assistant Examiner—R. Thomas Price
Attorney, Agent, or Firm—Foley & Lardner

[57] ABSTRACT

A bird feeder including a frame having a suet-seed cage assembly mounted on one or both sides of the frame and a perch mounted on the frame for supporting a bird in a position accessible to the cage assembly. The suet-seed cage assembly including a suet-seed cake and a cage for supporting the cake. The cake-cage assembly being supported in a tapered hole in the frame or in a "U" shaped groove on the face of the frame.

4 Claims, 3 Drawing Sheets

SUET-SEED CAKE BIRD FEEDER

FIELD OF THE INVENTION

The present invention relates to bird feeders and more particularly to a feeder having suet-seed cakes supported in cages readily accessible to birds.

BACKGROUND OF THE INVENTION

Bird feeders presently available generally provide for the storage of bird seed in a bin for distribution to trays for access by birds. The seeds in the bins fall by gravity onto the tray as seed is removed from the tray by a bird. The primary objection to this type of a dispensing system is the scattering of the seed from the tray by the birds resulting in considerable loss or waste of bird seed which falls to the ground. Efforts to correct this have been mainly by providing screens over the tray to limit the access to the seed in the tray.

SUMMARY OF THE INVENTION

The bird feeder according to the present invention includes a board or frame mounted in a generally vertical position and having one or more suet-seed cage assemblies mounted on the board and a perch for supporting birds in a position accessible to the suet-seed cage assembly. The suet-seed cage assemblies each include a compact suet and seed cake and a cage for supporting the cake on the board. The suet-seed cakes can be made in various configurations for insertion into specially formed cages. The cages are provided with openings on all sides which allow access to the suet-seed cakes by birds standing on the perch provided on the frame. The seeds in the cake are removed individually from the cake by the birds.

One of the primary advantages of the present invention is the reduction in the loss of bird seed by supporting the suet-seed cakes in specially designed cages which are used to support the cakes on the board.

A further advantage of the present invention is the reduction in wasted bird seed as well as the elimination of scattered bird seed all over the surrounding environment.

Other objects and advantages will become apparent from the following detailed description when read in conjunction with the accompanying drawings.

DETAILED DESCRIPTION OF THE DRAWINGS

Figure 3:
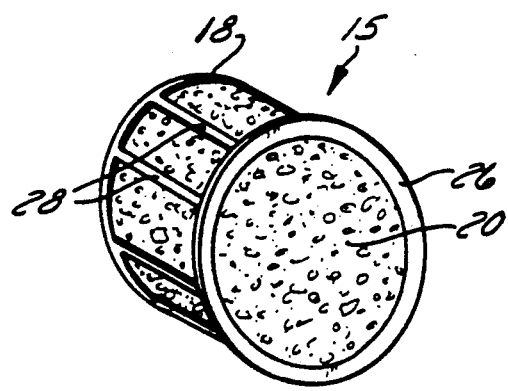
FIG. 3 is a perspective view of a suet-seed cage assembly.
Figure 4:
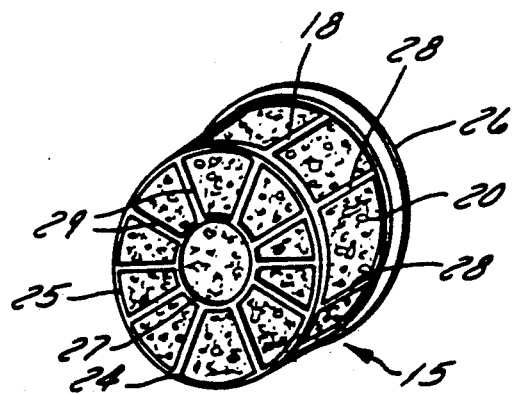
FIG. 4 is a perspective view of the back of the suet-seed cage assembly shown in FIG. 3.
Figure 2:
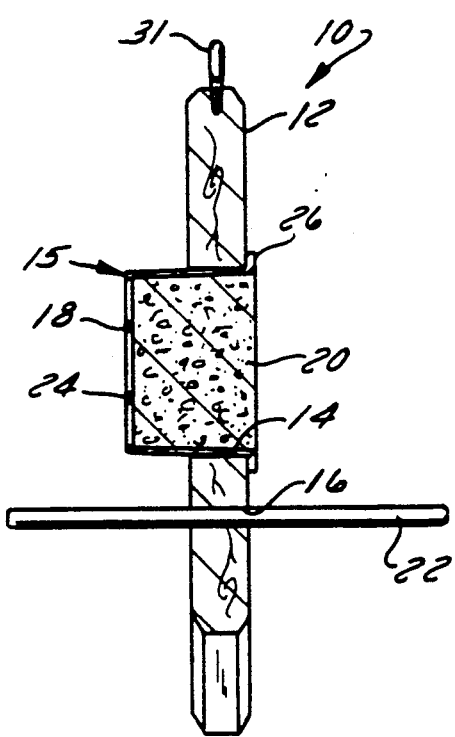
FIG. 2 is a side elevation view taken on line 2—2 of FIG. 1 showing the suet-seed cage assembly mounted in a tapered hole in the bird feeder frame.
Figure 1:
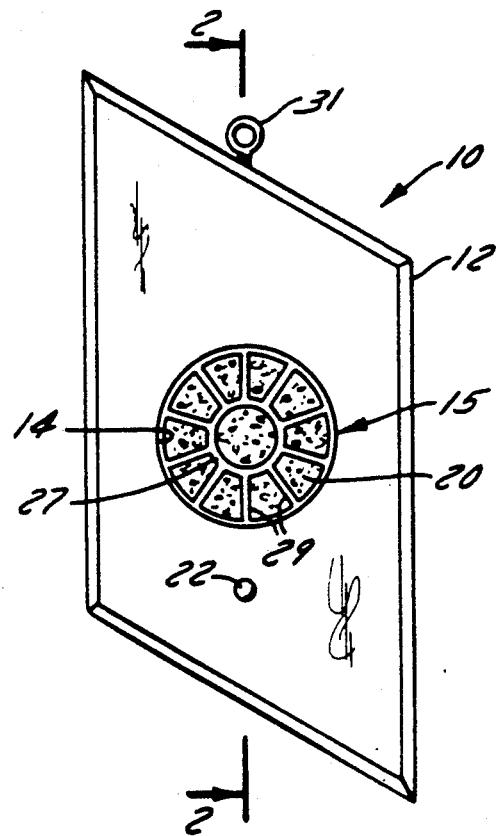
FIG. 1 is a front view of the bird feeder according to the invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE EMBODIMENT

The bird feeder 10 as shown in FIGS. 1-4 generally includes a frame 12 having a suet-seed cage assembly 15 mounted in a tapered hole or opening 14 in the frame 12. A perch 22 is mounted in a hole 16 located below the opening 14 to support a bird on either side of the frame 12. The bird feeder 10 can be hung on a cord or cable at any convenient location by means of an eye-type screw 31 provided in the top of the frame 12.

The assembly 15 generally includes a suet-seed cake 20 and a cage 18. The assembly 15 is supported in the frame 12 by means of the tapered relation of the opening 14 with the tapered sides of the cage 18. In this regard the cage 18 includes a circular front wall 24 and a circular flange 26 connected to the front wall 24 by means of a number of ribs 28. The front wall 24 is formed by an outer circular ring 25 and an inner circular ring 27 connected to ring 25 by means of strips 29. The ribs 28 are tapered inwardly from the inner edge of the flange 26 to the outer edge of ring 25 of the front wall 24 to provide the wedge fit in the opening 14. The assembly 15 is seated in the opening 14 by pushing the cage 18 through the opening until the flange 26 is seated on the surface of the frame 12. With this arrangement birds can feed off of the back face of the suet-seed cake on the inside of the flange 26, through the openings between the ribs 28 in the sides and the openings between the strips 29 in the front wall 24.

Figure 6:
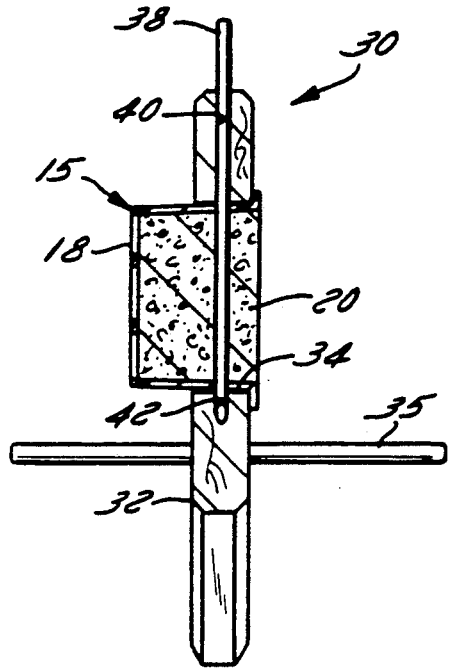
FIG. 6 is a view taken on line 6—6 of FIG. 5 showing the dowel passing through the suet-seed cage assembly.
Figure 5:
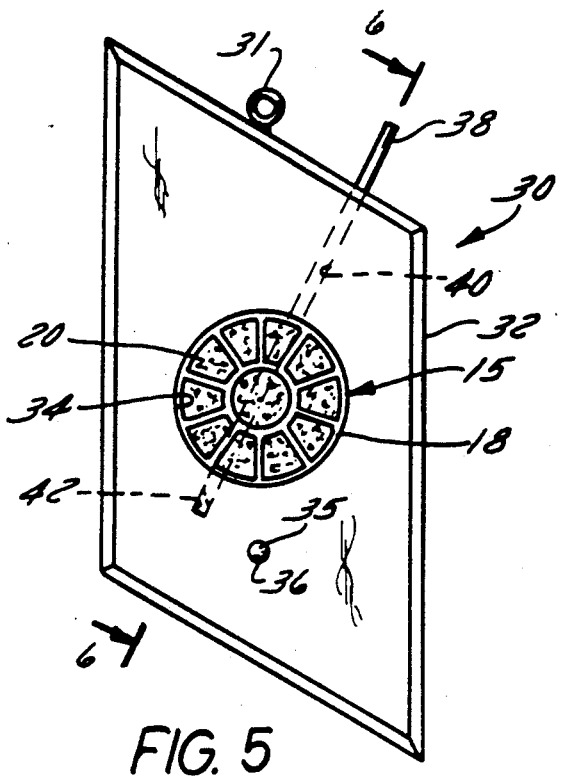
FIG. 5 is a view of an alternate embodiment of the invention wherein a dowel is used to hold the suet-seed cage assembly in the frame.

In the embodiment of the invention shown in FIGS. 5 and 6 the bird feeder 30 includes a seed-suet cage assembly 15 having the cage 18 for the suet-seed cake 20 secured to the frame 32 by means of a dowel 38. In this regard, the frame 32 includes an opening 34 and a hole 36. The cage 18 with the suet-seed cake 20 mounted therein is positioned in the opening 34. The cage 18 and suet-seed cake 20 are permanently secured to the frame 32 by means of a dowel 38 which is inserted through a hole 40 in the frame through the cage 18 and suet-seed cake 20 into a hole 42 on the opposite side of opening 34. A dowel 35 is inserted in hole 36 to provide a perch for the birds.

Figure 8:
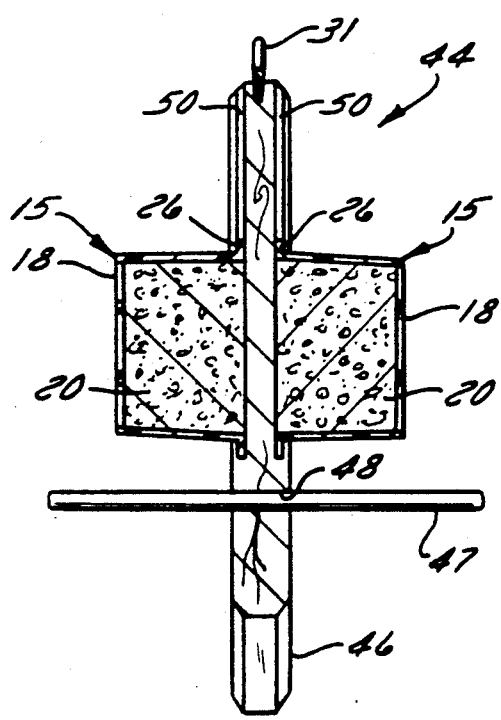
FIG. 8 is a view taken on line 8—8 of FIG. 7 showing a suet-seed cage assembly mounted on both sides of the frame.
Figure 7:
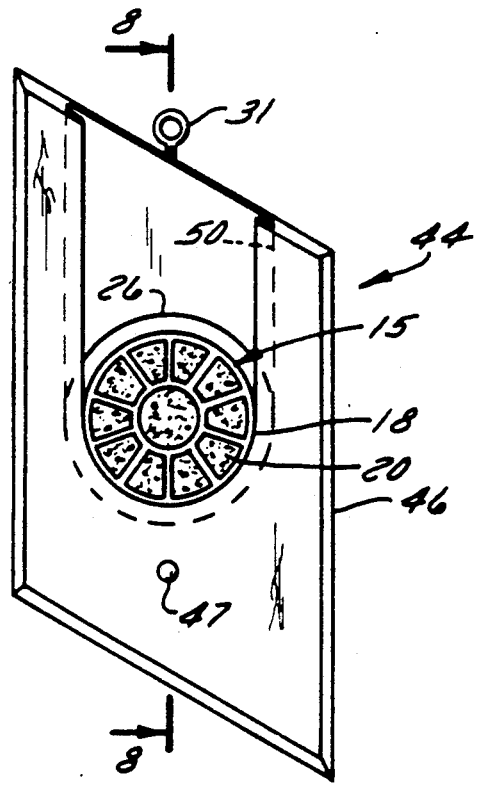
FIG. 7 is a front view of another embodiment of the invention having a suet-seed cage assembly supported in a slot in the frame.
Figure 11:
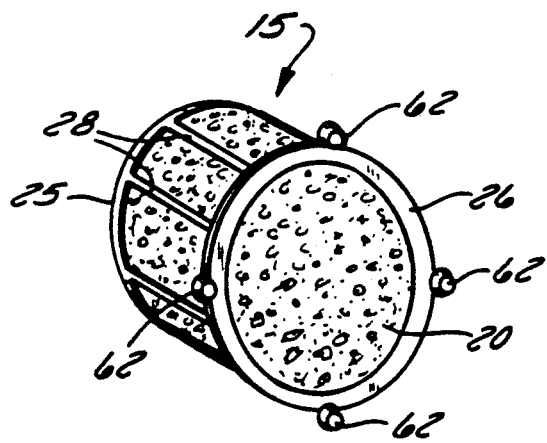
FIG. 11 is a perspective view of the suet-seed cage assembly.
Figure 12:
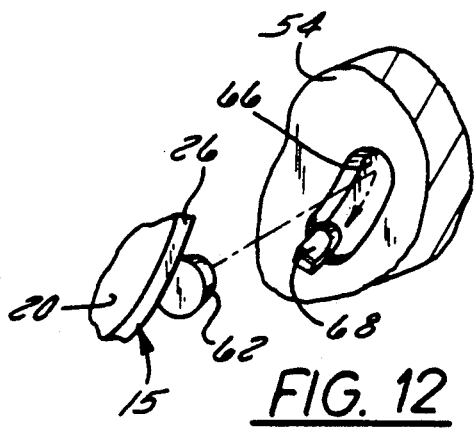
FIG. 12 is an enlarged perspective view of the mechanical mounting arrangement of the cage on the frame of FIG. 9.
Figure 10:
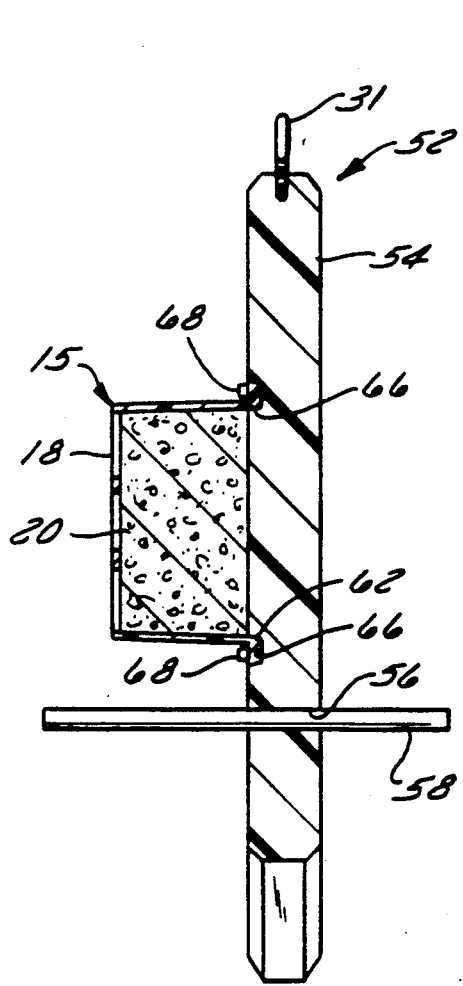
FIG. 10 is a view taken on line 10—10 of FIG. 9.
Figure 9:
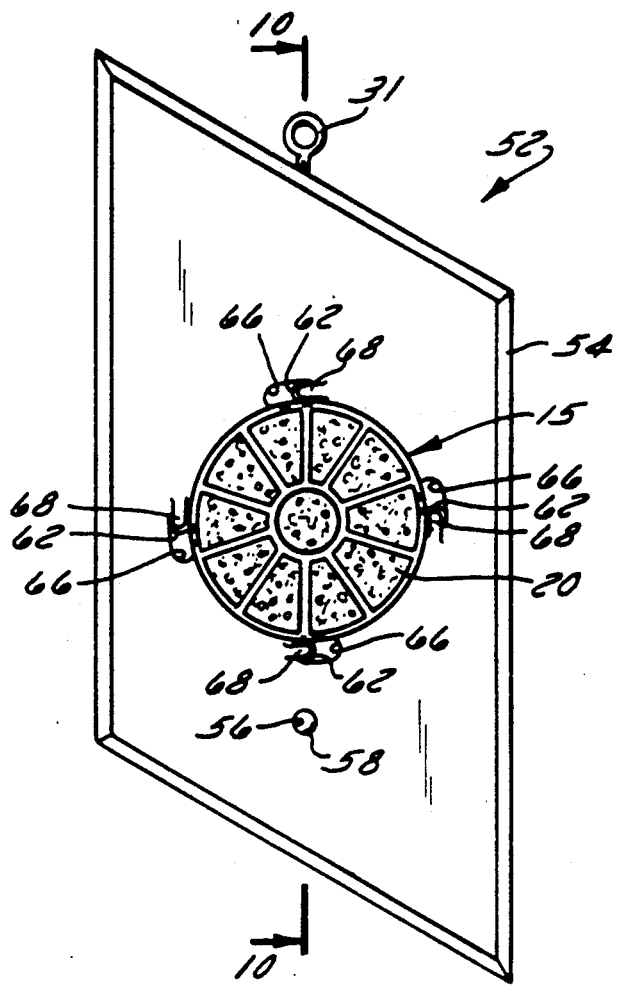
FIG. 9 is a front view of another embodiment of the invention showing a suet-seed cage assembly mechanically locked in the front side of the frame.

In the embodiment of the invention shown in FIGS. 7 and 8, the bird feeder 44 includes a frame 46, a cage 18 mounted on each side of the frame and a perch 47 positioned in a hole 48 below the cages 18. Means are provided on the front and back of the frame 46 for supporting the cages 18 on the frame 46. Such means is in the form of a U-shaped groove 50 provided on both the front and back of the frame 46. The groove 50 is of a depth sufficient to allow the flange 26 on cage 18 to slide down the grooves 50 until the cage rests on the bottom of the U-shaped groove.

In the embodiment of the invention shown in FIGS. 9-12 a bird feeder 52 is shown having a frame 54 with a hole 56 for a perch 58 and a number of arcuate slots 66. A suet-seed cage assembly 15 is secured to the frame 54 by means of a number of tabs 62 provided on the face of the flange 26 for the cage 18. The tabs 62 are secured in slots 66 provided in the face of the frame by means of hooks 68 mounted on the end of the slots 66. The assembly 15 is mounted on the frame 52 by aligning the tabs 62 in the slots 66 and rotating the assembly 15 to move the tabs 62 under hooks 68.

Thus, it should be apparent that there has been provided in accordance with the present invention a suet-seed cake bird feeder that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A bird feeder comprising:
    a frame having a front and a back,
    a cage mounted on said frame, said cage having a suet-seed cake housed therein and including a front wall and a flange connected to said front wall by a number of ribs whereby said cake is exposed to the birds,
    said frame including an opening tapered from said front to said back and said ribs on said cage being tapered from said flange inwardly to said front wall whereby said cage can be wedged into said tapered opening until said flange is flush with the front of said frame, and
    a perch mounted on said frame for supporting birds in a position accessible to said cage.

2. A bird feeder comprising:
    a frame having a front and back,
    a cage mounted on said frame, said cage having a suet-seed cake housed therein and including a front wall and a flange connected to said front wall by a number of ribs whereby said cake is exposed to the birds,
    said frame including an opening for said cage wherein said cage is positioned therethrough, and a dowel mounted in said frame and extending through said frame and said cage for retaining said cage on said frame, and
    a perch mounted on said frame for supporting birds in a position accessible to said cage.

3. A bird feeder comprising:
    a frame having a front and a back,
    a cage mounted on said frame, said cage having a suet-seed cake housed therein and including a front wall and a flange connected to said front wall by a number of ribs whereby said cake is exposed to the birds,
    said frame including a vertically disposed U-shaped slot on the front of said frame whereby said flange when seated in said slot supports said cage on the front of said frame, and
    a perch mounted on said frame for supporting birds in a position accessible to said cage.

4. A bird feeder comprising:
    a frame having a front and a back,
    a cage mounted on said frame, said cage having a suet-seed cake housed therein and including a front wall and a flange connected to said front wall by a number of ribs whereby said cake is exposed to the birds,
    said frame comprising a number of arcuate slots in said frame, each slot including a hook at one end and a corresponding number of tabs on said flange which are aligned in said slots and retained therein by said hooks, and
    a perch mounted on said frame for supporting birds in a position accessible to said cage.

* * * * *